United States Patent
Belden et al.

(10) Patent No.: US 9,776,921 B2
(45) Date of Patent: Oct. 3, 2017

(54) BRICKS AND METHOD OF FORMING BRICKS WITH HIGH COAL ASH CONTENT USING A PRESS MOLD MACHINE AND VARIABLE FIRING TRAYS

(75) Inventors: Robert Thomas Belden, Canton, OH (US); Michel Cristallo, Dijon (FR); George W. Ittmann, Baltimore, MD (US); Robert W. Ittmann, Gulf Stream, FL (US)

(73) Assignees: THE BELDEN BRICK COMPANY, LLC, Canton, OH (US); ECO-ASH, LLC, Baltimore, MD (US)

( * ) Notice: Subject to any disclaimer, the term of this patent is extended or adjusted under 35 U.S.C. 154(b) by 367 days.

(21) Appl. No.: 13/182,112

(22) Filed: Jul. 13, 2011

(65) Prior Publication Data

US 2012/0031306 A1     Feb. 9, 2012

Related U.S. Application Data

(60) Provisional application No. 61/363,854, filed on Jul. 13, 2010.

(51) Int. Cl.
*C04B 18/06*      (2006.01)
*B23Q 3/00*      (2006.01)
(Continued)

(52) U.S. Cl.
CPC .......... *C04B 33/1352* (2013.01); *B28B 5/025* (2013.01); *B28B 11/248* (2013.01); *B28B 15/00* (2013.01); *C04B 33/1324* (2013.01); *C04B 33/14* (2013.01); *C04B 33/30* (2013.01); *C04B 35/22* (2013.01); *C04B 35/62204* (2013.01); *F27B 17/0008* (2013.01); *C04B 2111/00793* (2013.01); *C04B 2235/3215* (2013.01); *C04B 2235/3272* (2013.01); *C04B 2235/36* (2013.01);
(Continued)

(58) Field of Classification Search
CPC .............................. C04B 18/08; C04B 18/088
USPC .................................................. 264/667, 609
See application file for complete search history.

(56) References Cited

U.S. PATENT DOCUMENTS 2,576,565 A   *   11/1951   Brown ........................... 501/155
3,402,834 A   *   9/1968   Kelsey ................... B65G 57/26
                                                            264/609

(Continued)

OTHER PUBLICATIONS

J. Van Der Zwan, J.W. De Jong, and M.M.A.L. Dominicus-Van Den Acker; Bodies Containing High Quantities of Fly Ash or Coal Mining Waste, Sep. 27, 2000, pp. 30-34, vol. 21, No. 8; Klei/Glas/Keramiek, Canadian Institute for Scientific and Technical Library; Canada.

(Continued)

*Primary Examiner* — Nahida Sultana
(74) *Attorney, Agent, or Firm* — Fay Sharpe LLP

(57) ABSTRACT

There is provided an apparatus and process for manufacturing a brick or paver with a high content of coal ash (ranging from 60% to 100% coal ash or fly ash) so that a waste product (coal ash, and more particularly Class F coal ash) from a coal-fired power plant is incorporated into a building product (high content fly ash brick or paver). Also provided is a variable firing tray to support the dried, high content coal ash bricks/pavers as the dried products are sent through a tunnel kiln, to improve circulation around the individual bricks/pavers and thereby result in reduced firing time in the kiln.

21 Claims, 17 Drawing Sheets

(51) Int. Cl.
*B28B 3/00* (2006.01)
*C04B 33/135* (2006.01)
*B28B 5/02* (2006.01)
*B28B 11/24* (2006.01)
*B28B 15/00* (2006.01)
*C04B 33/132* (2006.01)
*C04B 33/14* (2006.01)
*C04B 33/30* (2006.01)
*C04B 35/22* (2006.01)
*C04B 35/622* (2006.01)
*F27B 17/00* (2006.01)
*C04B 111/00* (2006.01)

(52) U.S. Cl.
CPC .. *C04B 2235/422* (2013.01); *C04B 2235/606* (2013.01); *C04B 2235/6021* (2013.01); *C04B 2235/6567* (2013.01); *C04B 2235/96* (2013.01); *C04B 2235/9623* (2013.01); *C04B 2235/9661* (2013.01); *Y02P 40/63* (2015.11); *Y02P 40/69* (2015.11)

(56) References Cited

U.S. PATENT DOCUMENTS

| | | | | |
|---|---|---|---|---|
| 3,468,998 | A * | 9/1969 | Lingl | B28B 11/16 264/148 |
| 3,478,896 | A * | 11/1969 | Pearne | B65G 57/26 414/791.8 |
| 4,120,735 | A | 10/1978 | Smith | |
| 4,148,662 | A | 4/1979 | Hughes et al. | |
| 4,441,615 | A * | 4/1984 | Goodrich | 206/511 |
| 4,701,222 | A * | 10/1987 | Kobayashi et al. | 106/457 |
| 5,336,453 | A * | 8/1994 | Giller et al. | 264/616 |
| 5,358,760 | A | 10/1994 | Furlong et al. | |
| 5,417,562 | A * | 5/1995 | Simon | 425/308 |
| 5,521,132 | A * | 5/1996 | Talmy et al. | 501/155 |
| 5,583,079 | A * | 12/1996 | Golitz et al. | 501/32 |
| 5,667,379 | A * | 9/1997 | Sporer | 432/258 |
| 6,277,189 | B1 * | 8/2001 | Chugh | 106/705 |
| 6,790,034 | B1 * | 9/2004 | Kearns et al. | 432/37 |
| 7,148,170 | B2 * | 12/2006 | Sasaki et al. | 501/155 |
| 7,264,673 | B2 | 9/2007 | Kayali et al. | |
| 8,672,675 | B2 * | 3/2014 | Miller | 432/253 |
| 2003/0013599 | A1 * | 1/2003 | Brosnan et al. | 501/141 |
| 2004/0040245 | A1 * | 3/2004 | Sinclair et al. | 52/605 |
| 2004/0217500 | A1 * | 11/2004 | Sinclair | 264/40.1 |
| 2006/0070406 | A1 * | 4/2006 | Raichel et al. | 65/134.8 |
| 2007/0011973 | A1 * | 1/2007 | Sinclair et al. | 52/503 |
| 2007/0087932 | A1 * | 4/2007 | Babliki | 501/141 |
| 2008/0023889 | A1 * | 1/2008 | Cheshire et al. | 264/644 |
| 2008/0199823 | A1 * | 8/2008 | Miller | 432/258 |
| 2010/0247937 | A1 * | 9/2010 | Liu et al. | 428/500 |
| 2011/0155019 | A1 * | 6/2011 | Albright et al. | 106/675 |
| 2011/0300032 | A1 * | 12/2011 | College | B01J 19/18 422/291 |
| 2013/0052351 | A1 * | 2/2013 | Koszo | 427/314 |
| 2014/0339456 | A1 * | 11/2014 | Moody | F16L 59/028 252/62 |

OTHER PUBLICATIONS www.deboermachines.nl, De Boer Machines Nederlands B.V. "Mould Chain Presses".
"PFA in brickmaking", PFA Technical Bulletin No. 6.
"Concrete Pavers", Concrete Homes Technology Brief, No. 18.
"Permeable Interlocking Concrete Pavement (PICP)", Municipal Officials Fact Sheet, ICPI 2008.
"Permeable Interlocking Concrete Pavement (ICP)", Design Professionals Fact Sheet, ICPI 2008.
"Permeable Interlocking Concrete Pavement (PICP)", Residential and Commercial Developers Fact Sheet, ICPI 2008.
"Permeable Interlocking Concrete Pavement (PICP)", Schools and Universities Fact Sheet, ICPI 2008.
"A Case Study in City Design and Engineering with Interlocking Concrete Pavements", ICPI 1997.
"Case Study in Engineered Interlocking Concrete Pavement—Hong Kong International Airport", ICPI 2004.
"Design Excellence at Intrawest Resorts", ICPI 2005.
Enhancing Urban Character with Interlocking Concrete Pavement, ICPI (undated).
"Project Profiles—Permeable Interlocking Concrete Pavements", ICPI 2005.

\* cited by examiner

BELDEN BRICK - FLY ASH MOLDED AND EXTRUDED BRICK PLANT
VFT TECHNOLOGY

| NO FLY ASH PRODUCTS WITH VFT PRODUCTS TYPE 4"X 2-1/4"X 8" | | NO FLY ASH PRODUCTS WITH VFT PRODUCTS TYPE 4"X 2-3/4"X 8" | | 40% FLY ASH EXTRUDED PRODUCTS WITH VFT | |
|---|---|---|---|---|---|
| TIME (HR) | TEMP (F) | TIME (HR) | TEMP (F) | TIME (HR) | TEMP (F) |
| 0.0 | 70 | 0.0 | 70 | 0.0 | 70 |
| 1.5 | 390 | 1.7 | 390 | 2.0 | 390 |
| 8.4 | 1300 | 9.3 | 1300 | 10.8 | 1470 |
| 17.9 | 1700 | 19.8 | 1750 | 23.0 | 1750 |
| 21.0 | 1950 | 23.2 | 1900 | 26.9 | 2010 |
| 21.3 | 2000 | 23.6 | 1990 | 27.4 | 2100 |
| 26.3 | 2000 | 29.1 | 1990 | 33.7 | 2100 |
| 28.2 | 1090 | 31.2 | 1090 | 36.2 | 1090 |
| 30.1 | 975 | 33.4 | 975 | 38.6 | 950 |
| 30.9 | 920 | 34.2 | 920 | 39.6 | 840 |
| 34.0 | 250 | 38.0 | 200 | 44.0 | 175 |

EXISTING TECHNOLOGY

| NO FLY ASH PRODUCTS-PLANT#2 PRODUCTS TYPE 4"X 2-1/4"X 8" | | NO FLY ASH PRODUCTS-PLANT#2 PRODUCTS TYPE 4"X 2-3/4"X 8" | | 40% FLY ASH EXTRUDED PRODUCTS WITH EXISTING TECHNOLOGY | |
|---|---|---|---|---|---|
| TIME (HR) | TEMP (F) | TIME (HR) | TEMP (F) | TIME (HR) | TEMP (F) |
| 0.0 | 302 | 0.0 | 325 | 0.0 | 70 |
| 6.6 | 875 | 8.0 | 805 | 2.9 | 390 |
| 13.7 | 1375 | 16.6 | 1380 | 15.9 | 1150 |
| 17.9 | 1834 | 21.7 | 1760 | 33.9 | 1900 |
| 20.0 | 1938 | 24.2 | 1900 | 39.7 | 2070 |
| 22.1 | 2010 | 26.8 | 1990 | 40.4 | 2100 |
| 24.2 | 2010 | 29.4 | 1990 | 46.7 | 2100 |
| 28.8 | 1180 | 35.0 | 1180 | 53.4 | 1090 |
| 32.0 | 1017 | 38.8 | 975 | 57.1 | 930 |
| 33.0 | 985 | 40.1 | 920 | 58.5 | 840 |
| 40.0 | 400 | 48.0 | 400 | 65.0 | 300 |

Fig. 10A

BRICKS AND METHOD OF FORMING BRICKS WITH HIGH COAL ASH CONTENT USING A PRESS MOLD MACHINE AND VARIABLE FIRING TRAYS

This application claims priority from U.S. provisional application Ser. No. 61/363,854, filed 13 Jul. 2010.

BACKGROUND

This application is directed to making bricks and more particularly to a process of manufacturing bricks, and the resultant bricks manufactured by the process, having a high coal ash content. For purposes of the present application, coal ash generally includes both fly ash and bottom ash, and thus reference to any of coal ash, fly ash, and bottom ash can be used interchangeably unless specifically noted otherwise. Selected aspects of the present disclosure may find application in related manufacturing processes.

Brick manufacturing is well known and has been developed over thousands of years so that even today the commercial process is substantially unchanged over many years. The most widely used processes are either to mold or press mold the bricks or alternatively to extrude the bricks. Shale (dry clay) or clay has water added in a desired amount along with other constituents to form a green body. The green body is subsequently dried to remove moisture in the brick, then fired to incipiently fuse or vitrify the components, and next cooled in a controlled manner to result in the final brick that has structural strength and integrity as widely used in the construction industry.

As an example only, in order to make press molded brick the clay or shale is first ground and mixed with water to the desired consistency. The clay is then pressed into molds with a press, and the molded clay is then fired or burned at approximately 900-1150° C. to achieve strength. Alternatively, the bricks subsequently move slowly through a tunnel kiln on conveyors, rails, or kiln cars. The bricks often have added lime, ash, and organic matter to speed the burning process.

In contrast, with extruded brick, ground clay or shale is mixed with 10-25% water and the material is pushed forced through a die to form the desired width and depth. The extrudate is subsequently cut into bricks of the desired length. The cut bricks are then dried for about 20 to 40 hours at approximately 400° F. to harden before being fired in the kiln. Oftentimes, the heat for drying is residual heat from the kiln.

Like any process, manufacturers are constantly evaluating new materials and processes in an effort to reduce the cost of the final product, and particularly without any loss in performance of the manufactured product. Various attempts to incorporate different low cost materials into the brick have been made. For example, pulverized coal-fired power plants generate large quantities of coal ash which includes what is generally referred to as bottom ash and fly ash. Fly ash is the fine-grained, powdery particulate material that is carried off in effluent gas emitted by the power plant. Electrostatic precipitators, filters, cyclones, or other devices are used by the power industry to collect the fly ash and significantly reduce the amount of fly ash released into the atmosphere. Disposal of these residual ash materials is estimated to cost on the order of $85 billion in the US and, if placed in a landfill, the bottom/fly or coal ash is treated like a hazardous material.

Depending upon the coal used as the fuel source, the components of coal ash will in turn vary, but generally speaking all coal ash includes substantial amounts of silicon dioxide ($SiO_2$) and calcium oxide (CaO) that is classified by ASTM standard C618 as either Class C or Class F coal ash. Class F coal ash is a byproduct of bituminous coal with small amounts of CaO. More particular details of Class F coal ash are specified by the chemical composition and physical requirements of ASTM C618. On the other hand, coal ash that is produced from the burning of lignite or sub-bituminous coal has a content of approximately 15-30% CaO and is identified as Class C coal ash. Most Class C coal ashes have self-cementing properties.

To date, incorporating coal ash as a constituent material of brick has met with only limited success. These efforts are heretofore limited by the percentage content of coal ash used in the brick. For example, U.S. Pat. Nos. 4,120,735; 5,358,760; and 7,264,673 are illustrative of prior attempts to incorporate coal ash into bricks.

A need exists to include a greater content of coal ash into bricks. Likewise, incorporating greater coal ash content that improves processing times, cost of manufacture, energy utilization, and maintenance of desired brick quality and strength characteristics, is advantageous from manufacturing, sustainability, and environmental points of view.

SUMMARY

There is provided an apparatus and process for manufacturing a brick or paver with a high content of coal ash (ranging from 60% to 100% coal ash or fly ash) so that a waste product (coal ash, and more particularly Class F coal ash) from a coal-fired power plant is incorporated into a building product (high content fly ash brick or paver).

Use of a variable firing tray to support the dried, high content coal ash bricks/pavers as the dried products are sent through a tunnel kiln improves circulation around the individual bricks/pavers and thereby results in reduced firing time in the kiln.

Still other features and benefits of the present disclosure will become apparent upon reading and understanding the following detailed description.

DETAILED DESCRIPTION OF THE PREFERRED EMBODIMENTS

Figure 1:
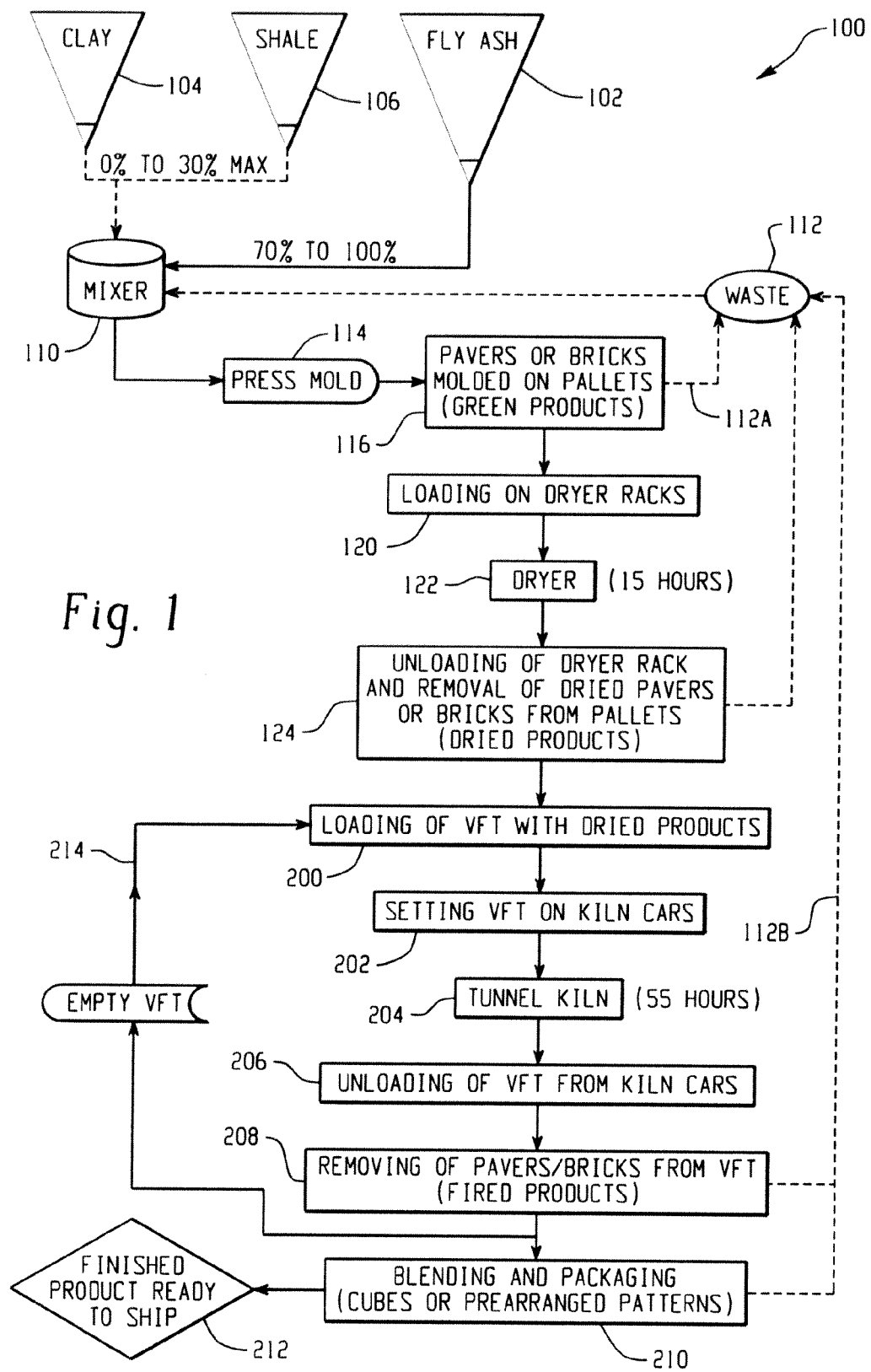
FIG. 1 is a flow chart detailing the general manufacturing process.

FIG. 1 generally shows a process (generally identified by reference numeral 100) of manufacturing coal or fly ash bricks/pavers in accordance with the present disclosure. More particularly, the process 100 incorporates 60-100% coal ash (fly ash) 102 combined with clay from supply 104 and/or shale (supply 106) that are added together and comprise approximately 0-40%. A small amount of colorant and barium are added on the order of a few percentage each. The ingredients are mixed with water in a mixer (step 110) and may also be combined with recycled waste in step 112 of portions of dried pavers or bricks that have not passed quality control from one or more locations downstream in the process. For example, waste (step 112A) from damaged molded pavers or bricks resulting from positioning on pallets or waste (step 112B) from damaged molded pavers or bricks exiting a dryer are added into the mixer. The mixture enters a mold press (step 114 FIG. 9) where green bricks and pavers of various preselected dimensions are formed and molded on pallets (see step 116). The green products are subsequently loaded on to dryer racks as represented by 120 for drying (step 122) in a dryer for approximately 15 hours. Once the drying period has expired, the dried products are unloaded and dried pavers and bricks are removed from the pallets in step 124. For example, and without limiting the present disclosure, fired pavers/bricks may be formed in various sizes (including conventional fired sizes of 4×8×2¼; 4×8×2¾*; 4½×9×2¼; 8×8 2¼*; 8×8×2¾*; 6×6×2¼*; 6×6×2¾*; 6×9×2¼*; 6×9×2¾*; 4×12×2¼*; 4×12×2¾*; 5×10×2¼*; and 5×10×2¾*; 3×7⅝×2¼*; 3×7⅝×2¾*; 3×11⅝×2¼*; and 3×11⅝×2¾*; etc.). Those brick/paver sizes identified with an asterisk (*) can only be made with the present commercial process because a traditional commercial kiln would not be able to economically fire/oxidize these larger and/or thicker products.

Next, the dried products are loaded on to variable firing trays (VFTs) (step 200) and the loaded VFTs are set on kiln cars in step 202. The kiln cars are next introduced into the tunnel kiln in step 204 and the dried products are fired for approximately 55 hours. The variable firing trays are then removed from the kiln cars in step 206, and the fired product (individual bricks and pavers) is removed or unloaded from the VFTs (step 208). Blending and packaging in step 210 is undertaken and the fired product is prearranged or cubed. As a result, finished product is ready for shipment to the customer in step 212. The empty VFTs are then used again as indicated by reference numeral 214.

Figure 2A:
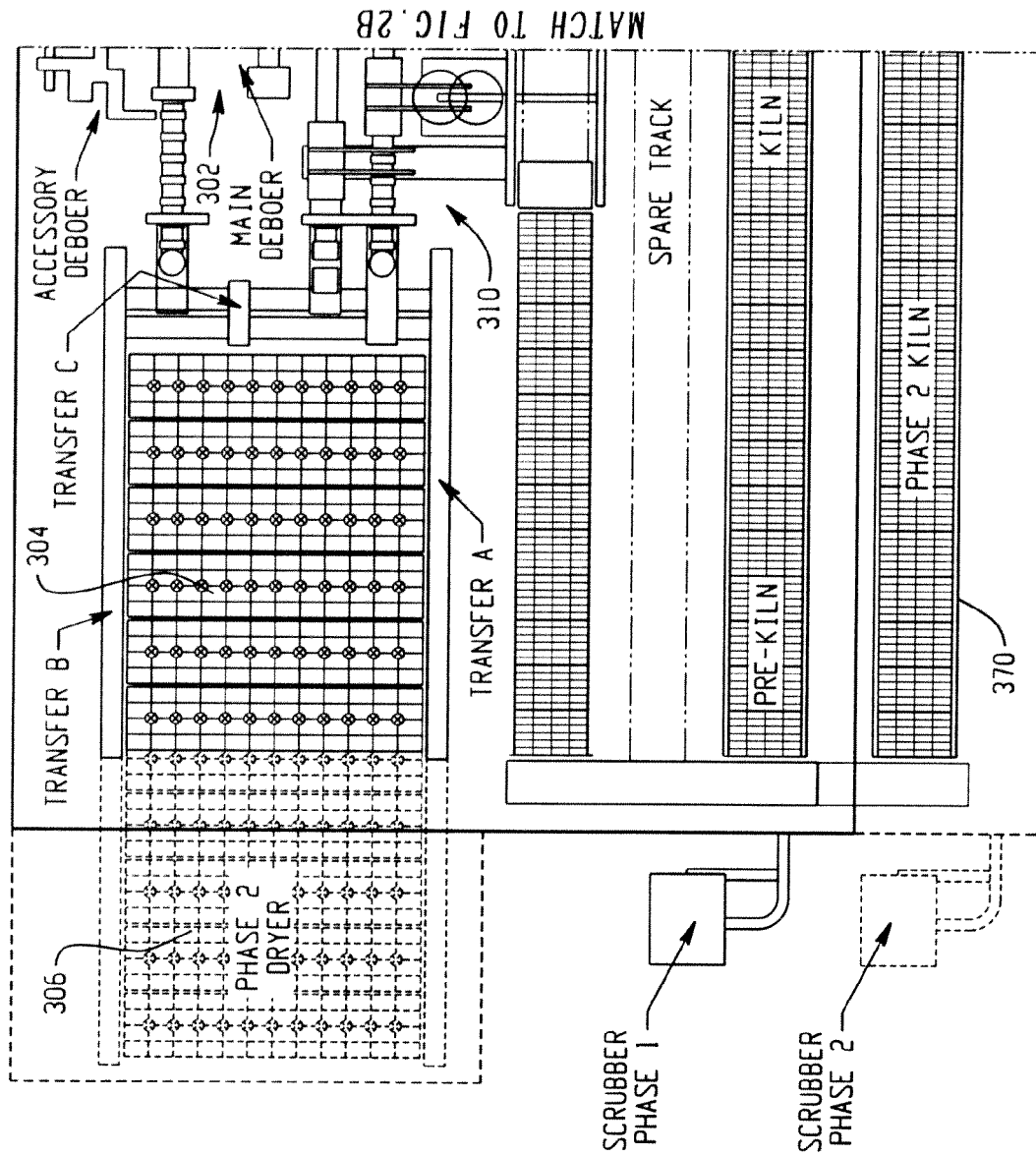
FIG. 2 is a schematic representation of a preferred plant layout.
Figure 2B:
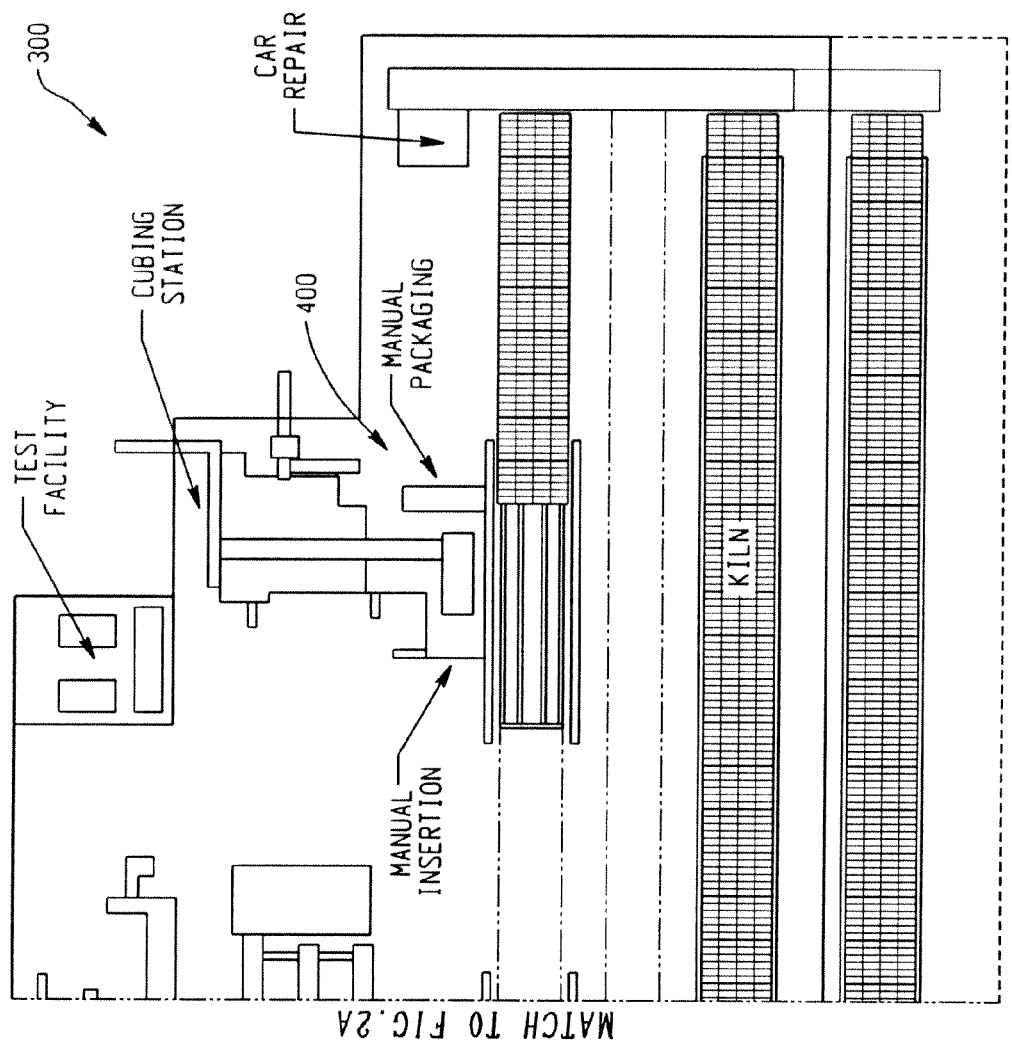
Figure 3:
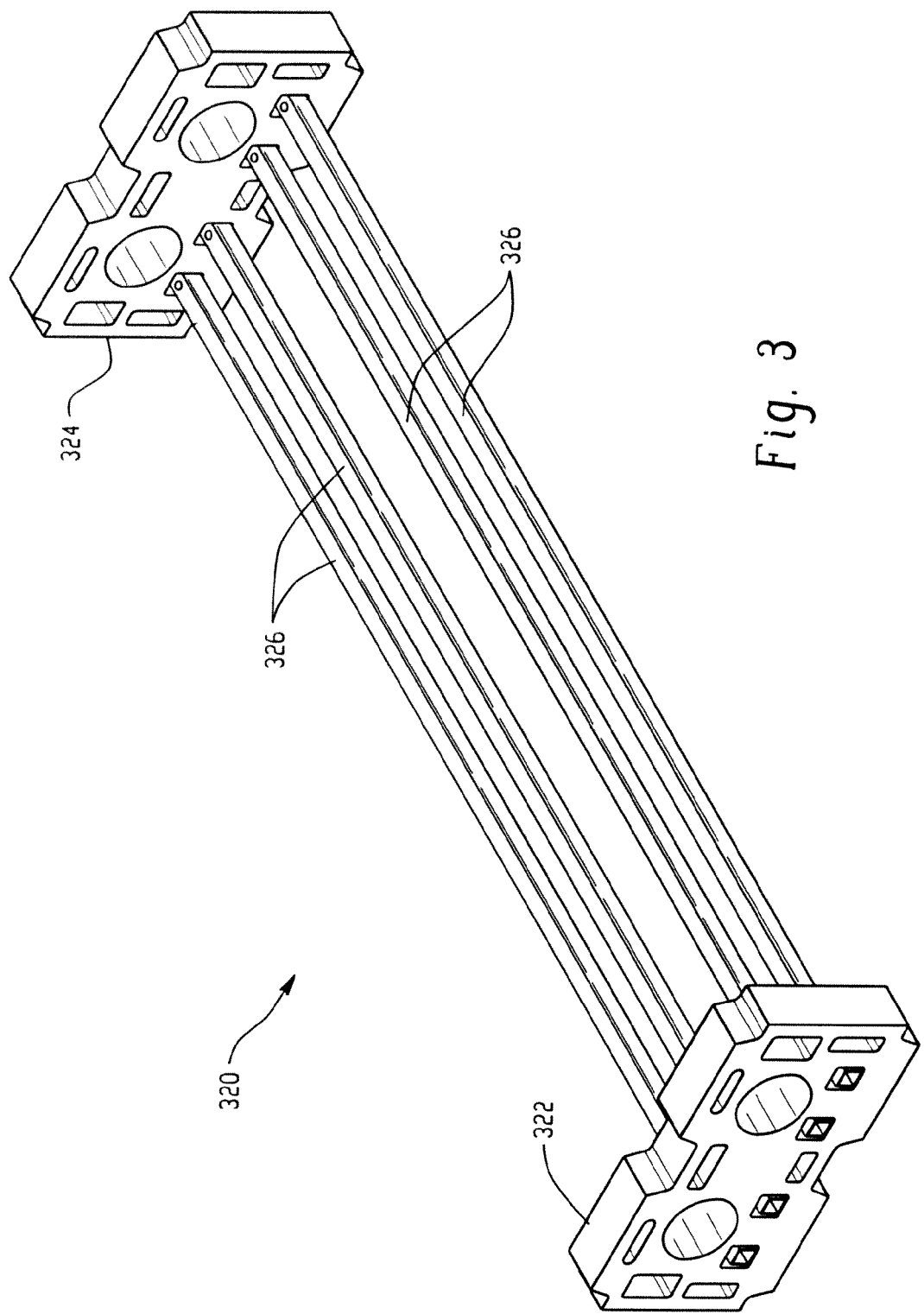
FIG. 3 is perspective view of a variable firing tray (VFT).
Figure 4:
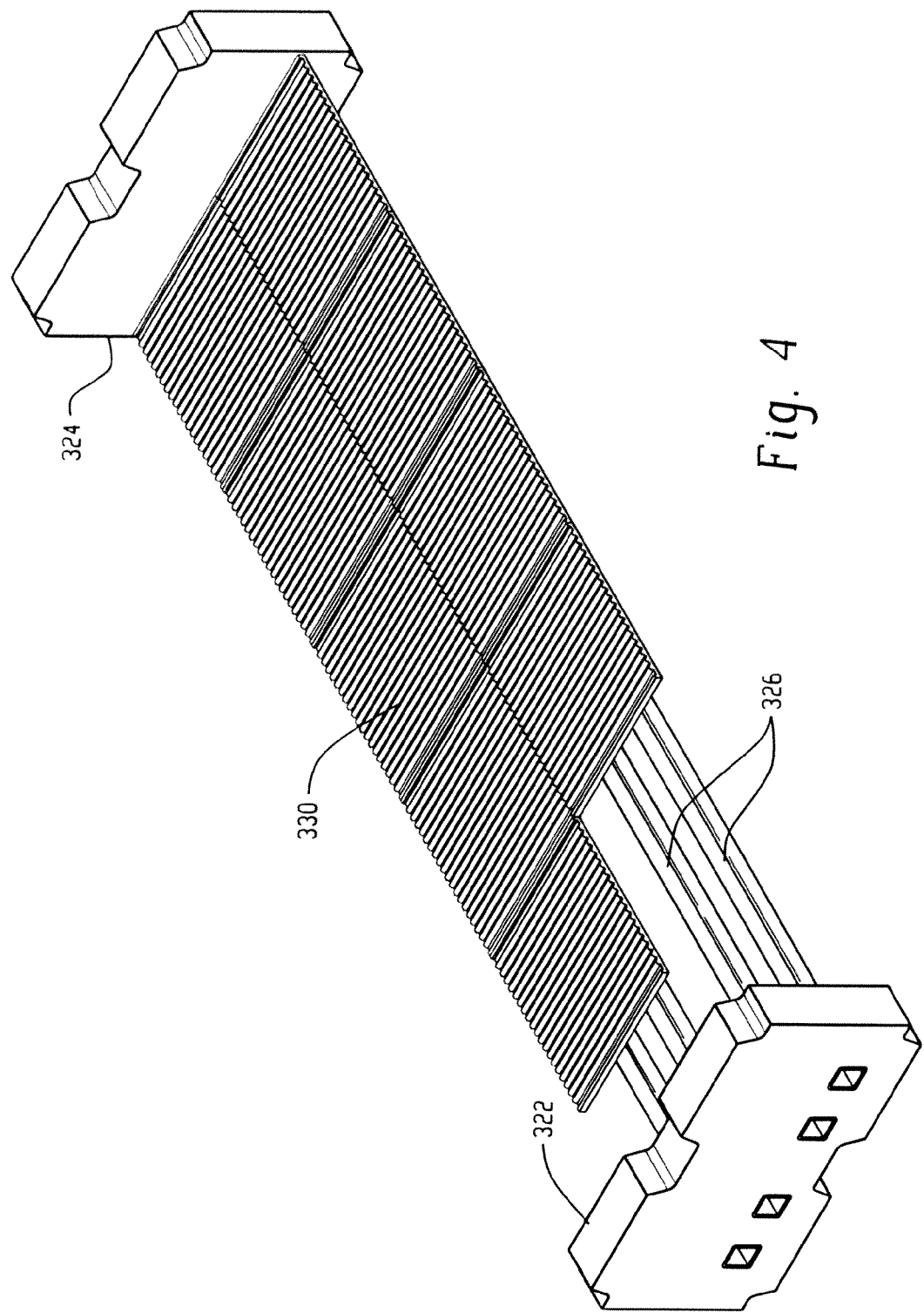
FIG. 4 is perspective view similar to FIG. 3 with refractory plate supported on silicon carbide beams.
Figure 5:
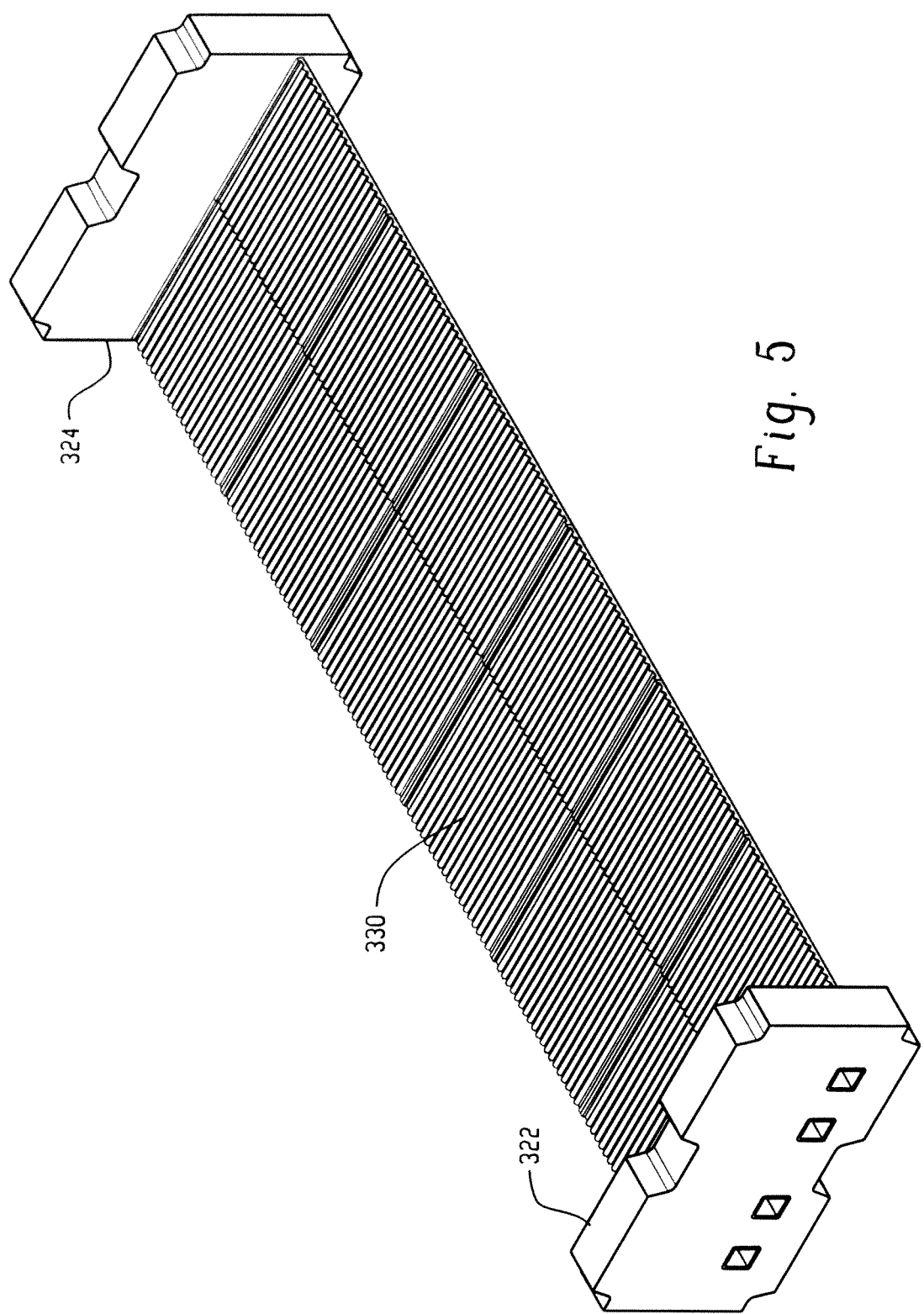
FIG. 5 is a perspective view similar to FIG. 4 showing the remaining refractory plates covering the beams.

Turning to FIG. 2, a plant layout 300 is generally illustrated and includes a mold press 302 where the coal ash/fly ash, clay, and/or shale are mixed with colorant, barium, and water to form green pavers or bricks that are positioned on dryer racks 304 and transported to a dryer where the green products are exposed to an elevated drying temperature on the order of approximately 400° F. The drying time is significantly reduced when using the high content of coal ash in the bricks/pavers. Thus, it is estimated that the drying time is approximately 12-18 hours. The dried products then leave the dryer 306 and are loaded onto variable firing trays at station 310.

With continued reference to FIG. 2, and additional reference to FIGS. 4-8, a variable firing tray 320 includes first and second legs or end members 322, 324 that are interconnected in spaced relation by a series of support bars or silicon carbide beams 326. Four support bars span the extended length between the legs 322, 324, although the specific number of support bars is not deemed to be limiting. As additionally illustrated in FIGS. 4 and 5, refractory support plates 330 extend over the support bars 326 and provide a generally planar surface having a series of grooves and ridges (i.e., a corrugate-type structure) that support the dried pavers or bricks thereon. The corrugate-type structure maximizes the surface area of the dried paver or brick exposed to the elevated temperatures of the tunnel kiln.

Figure 6:
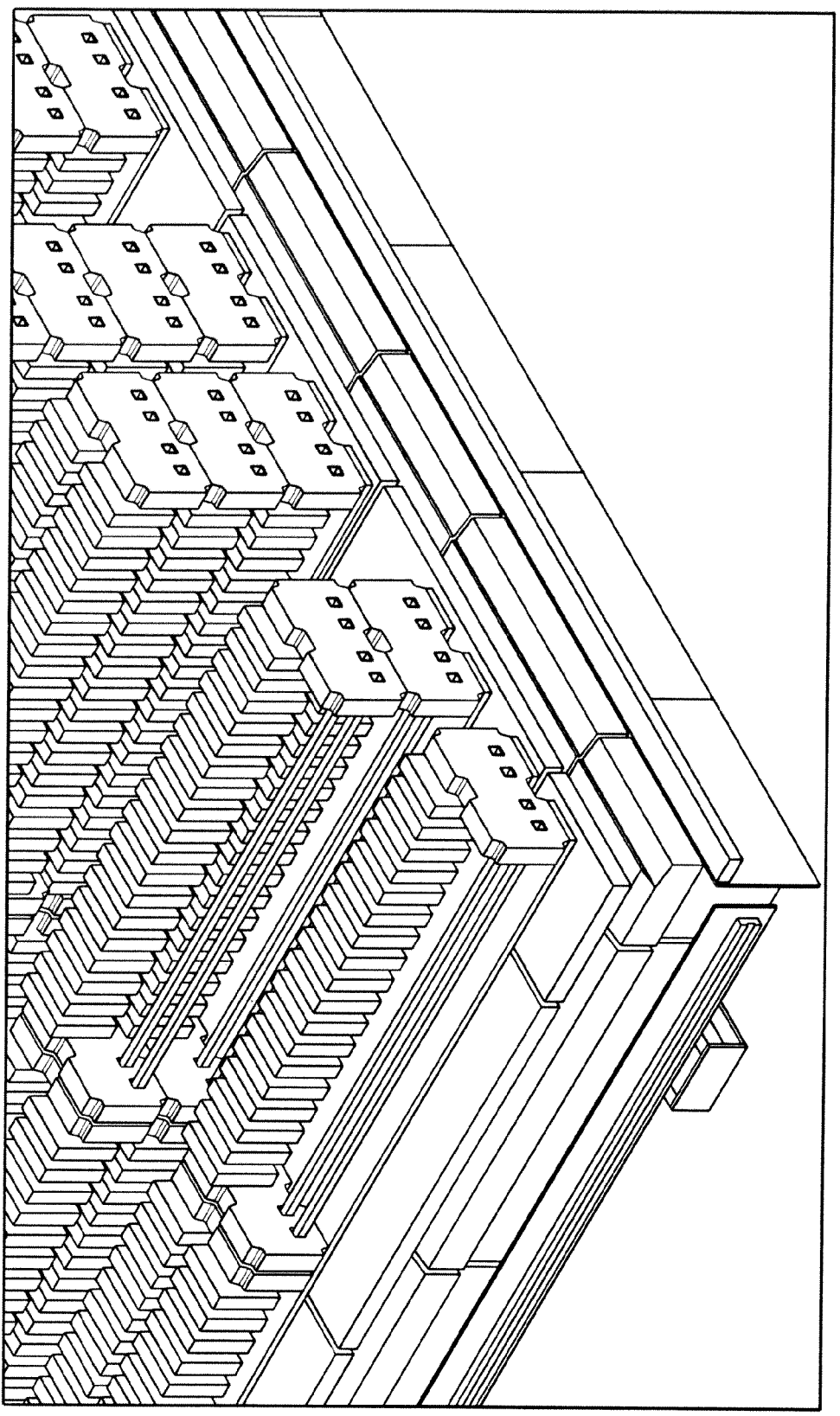
FIG. 6 is a perspective view of variable firing trays on a kiln car and supporting bricks/pavers as the VFTs travel on the kiln car through a tunnel kiln.
Figure 7:
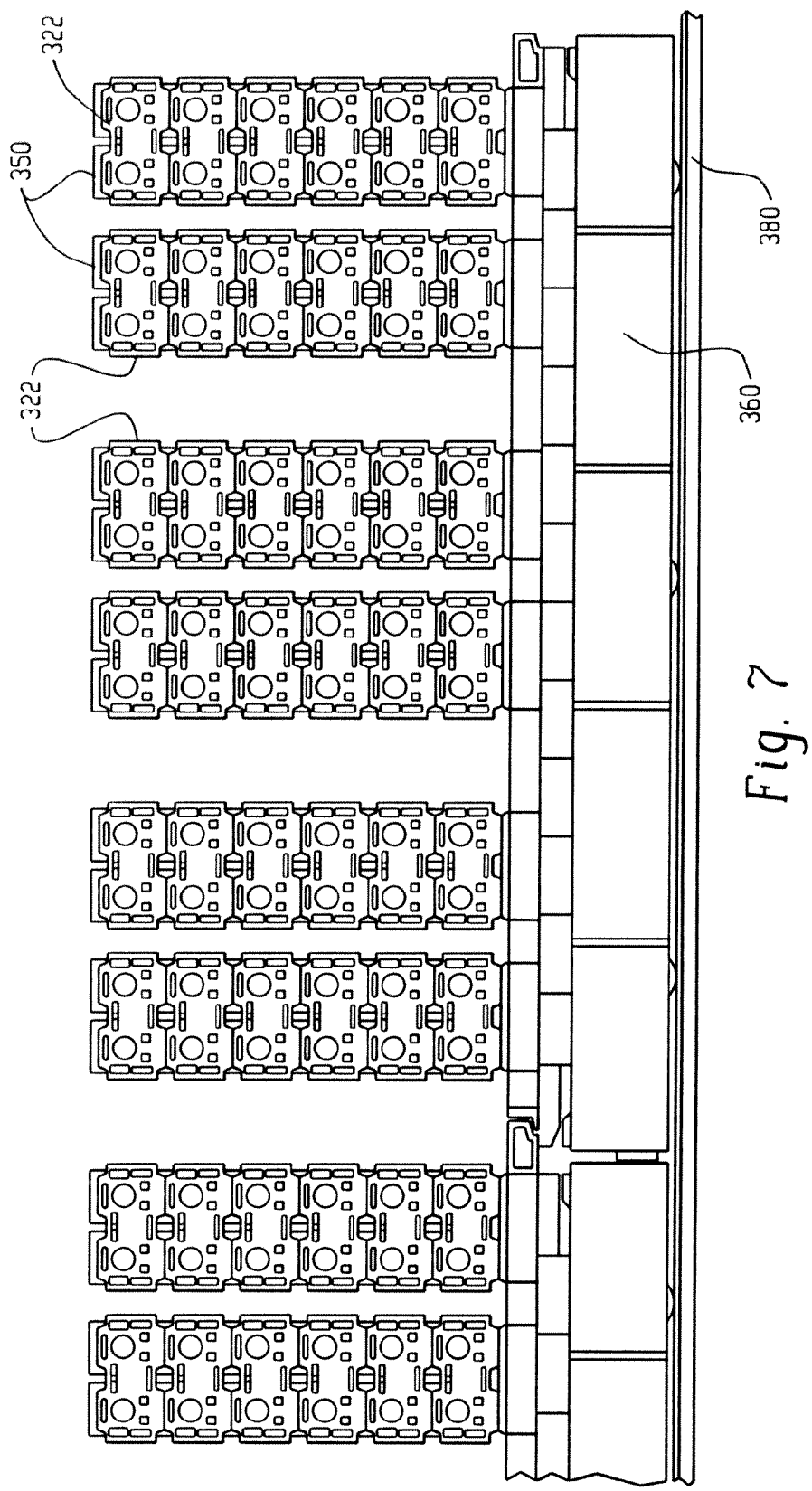
FIGS. 7 and 8 are elevational side and end views of the loaded kiln cars carrying VFTs loaded with bricks/pavers.
Figure 8:
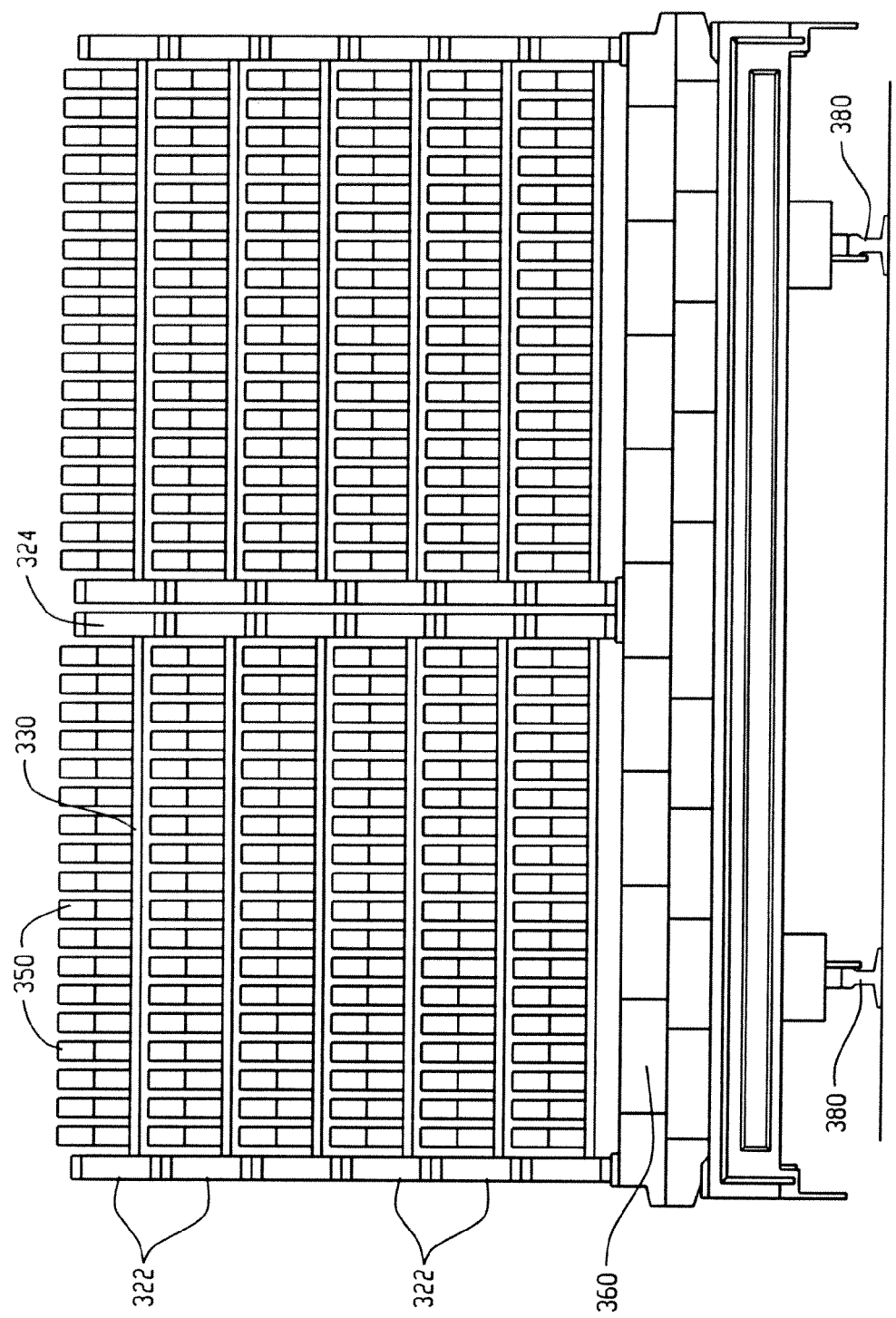
Figure 9A:
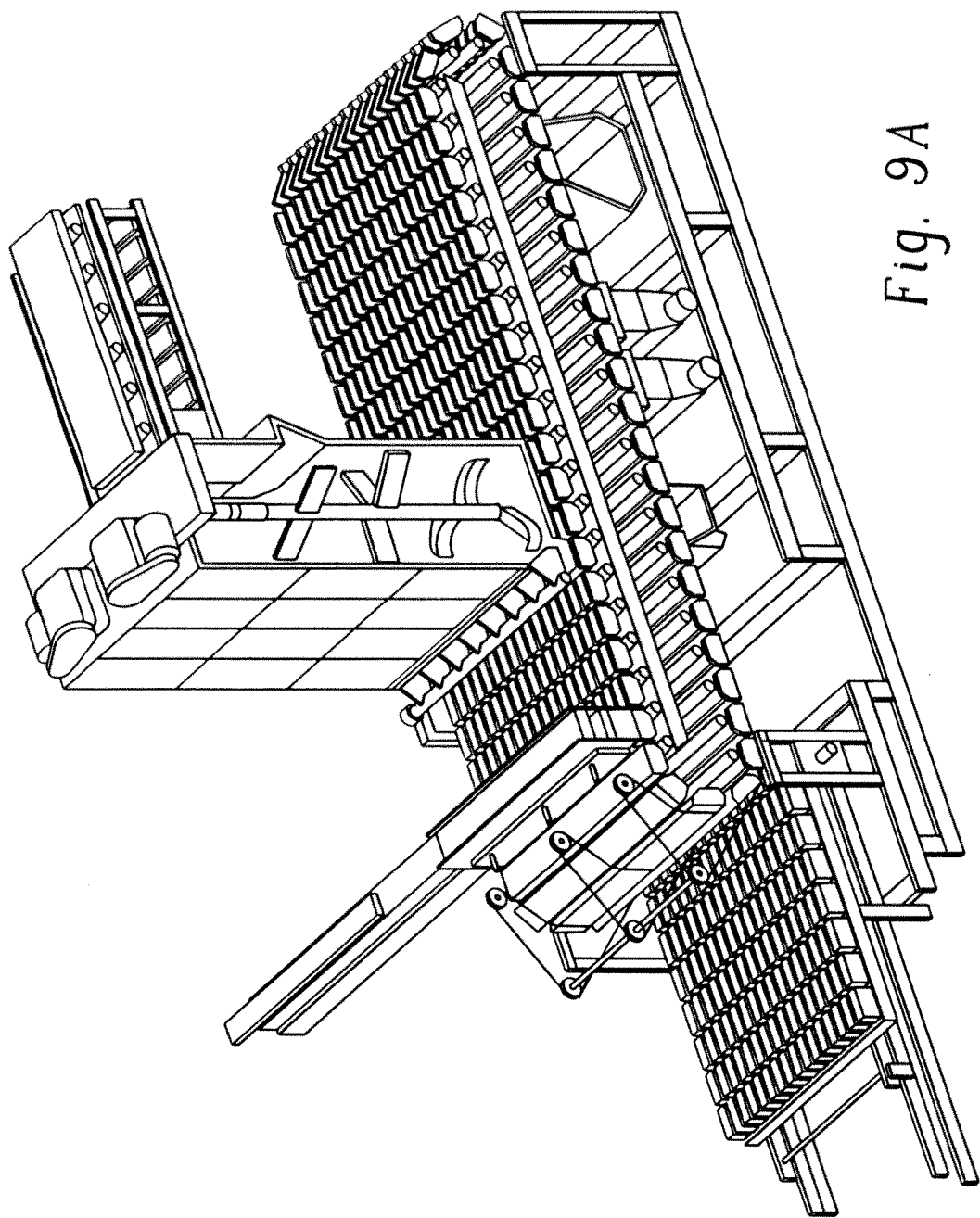
FIG. 9 shows a press mold for molding bricks/pavers.
Figure 9B:
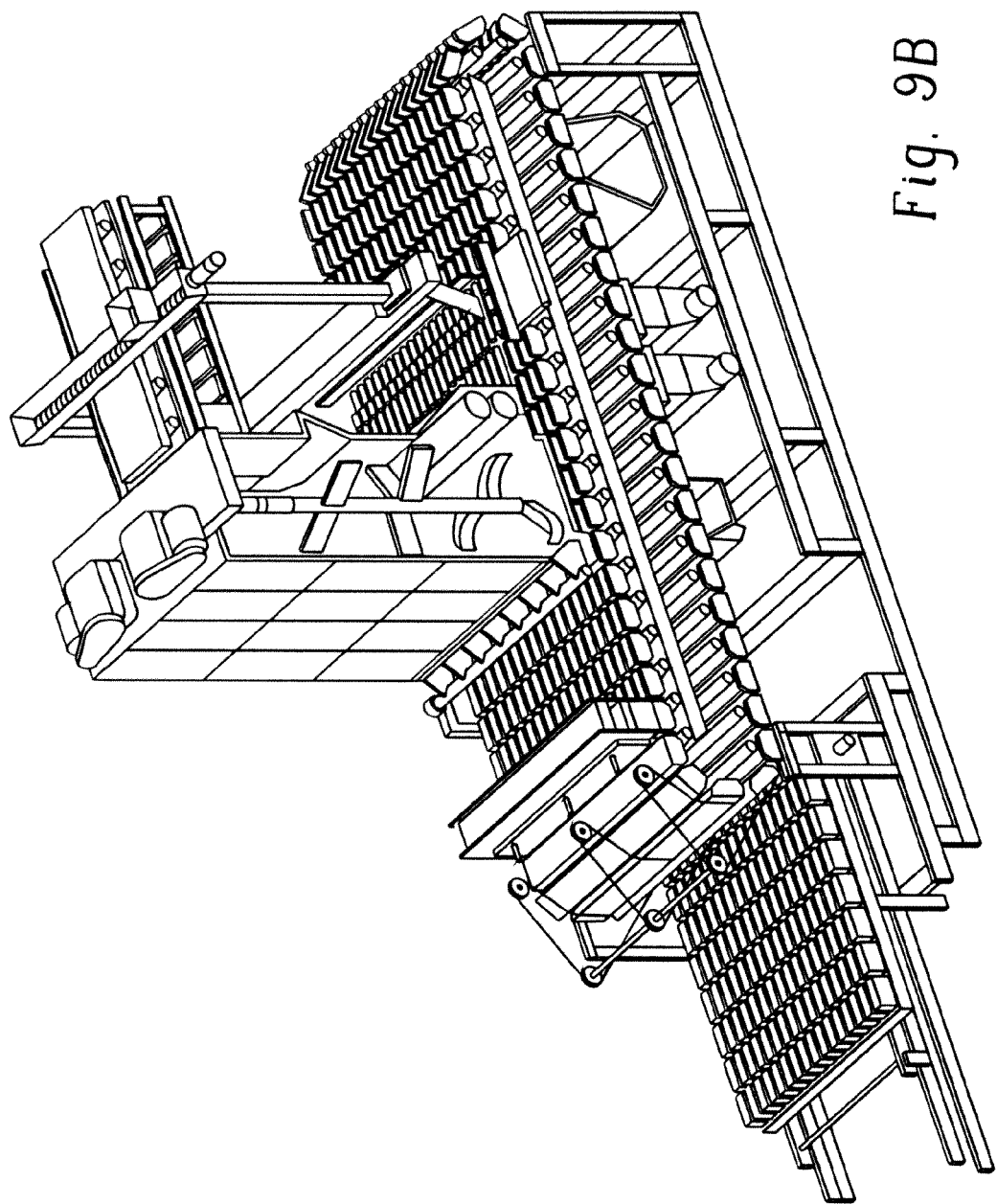
Figure 9C:
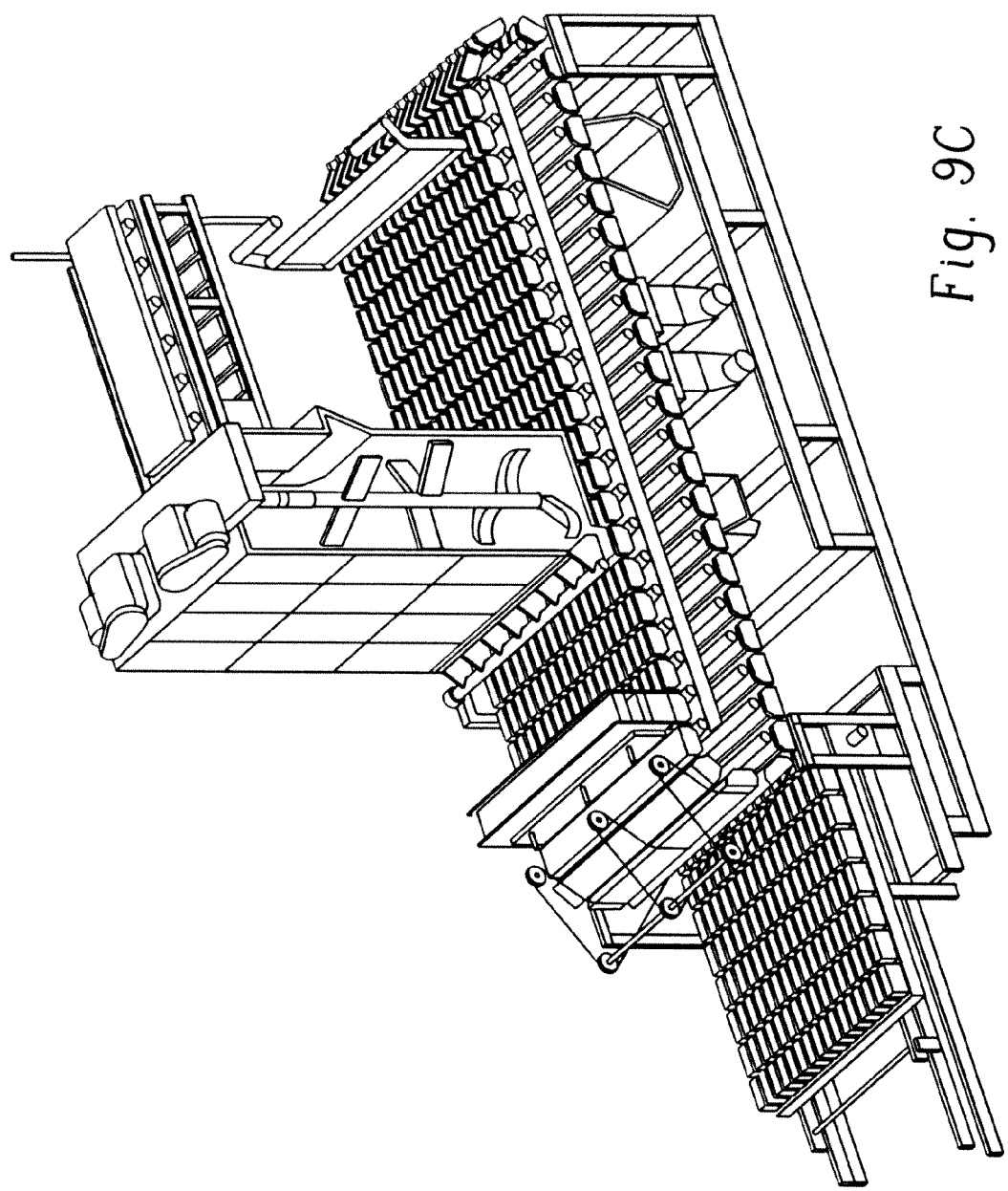
Figure 9D:
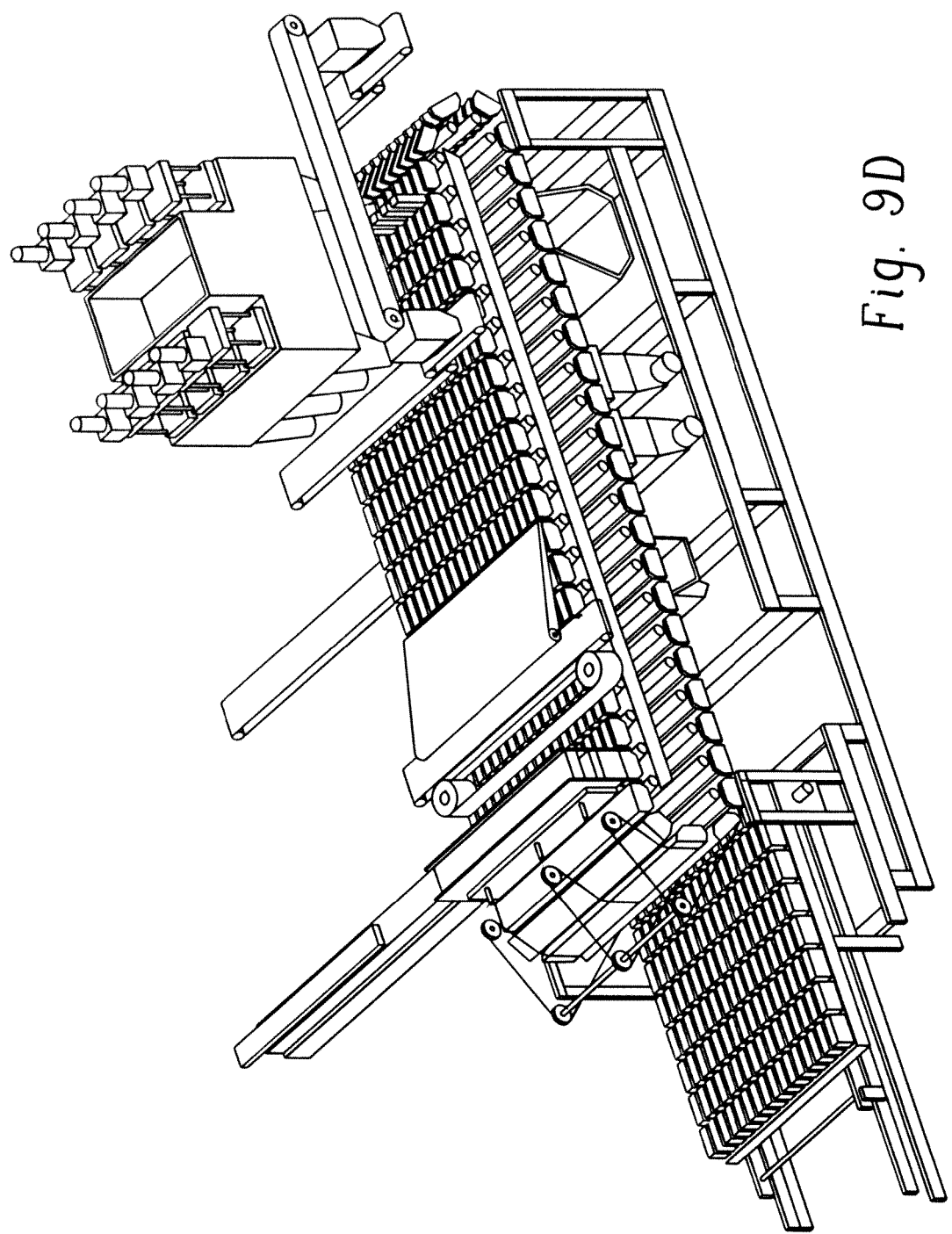

Thus, and as more particularly shown in FIG. 6, the dried pavers or bricks 350 are stacked in spaced relation along the support plate 330 between the legs 322, 324 of the variable firing trays. In addition, one variable firing tray is stacked atop another as shown in FIG. 6, and also illustrated in FIGS. 7 and 8. As will be appreciated, the vertical stacking loads are conveyed through the legs 322, 324 of the VFTs and transferred to kiln cars 360 that moveably transport the bricks and pavers stacked on the VFTs through the tunnel kiln 370 (FIG. 2). The firing cycle exposes the dried product to elevated temperatures at a temperature up to about 1150° C., where the high content coal ash/fly ash bricks and pavers are fired. The tunnel kiln is on the order of approximately 600 feet long in a proposed plant layout shown in FIG. 2 although the precise length should not be deemed to be limiting, with multiple lines possible. In one design, 48 cars are each stacked with 4 VFTs across an upper surface and each of these VFTs may support a stack of VFTs on top of them as shown in FIGS. 7 and 8. The kiln cars slowly transport the pavers and bricks along rails 380 through the tunnel kiln 370. The fired product of pavers and bricks are then removed from the VFTs 320 and packaged at station 400 (FIG. 2) where the finished product is ready to ship to customers.

A preferred press mold 500 is shown in FIG. 9. For example, one commercially available mixer press is available from DeBoer where the materials are mixed and the molds filled by a press block.

Figure 10B:
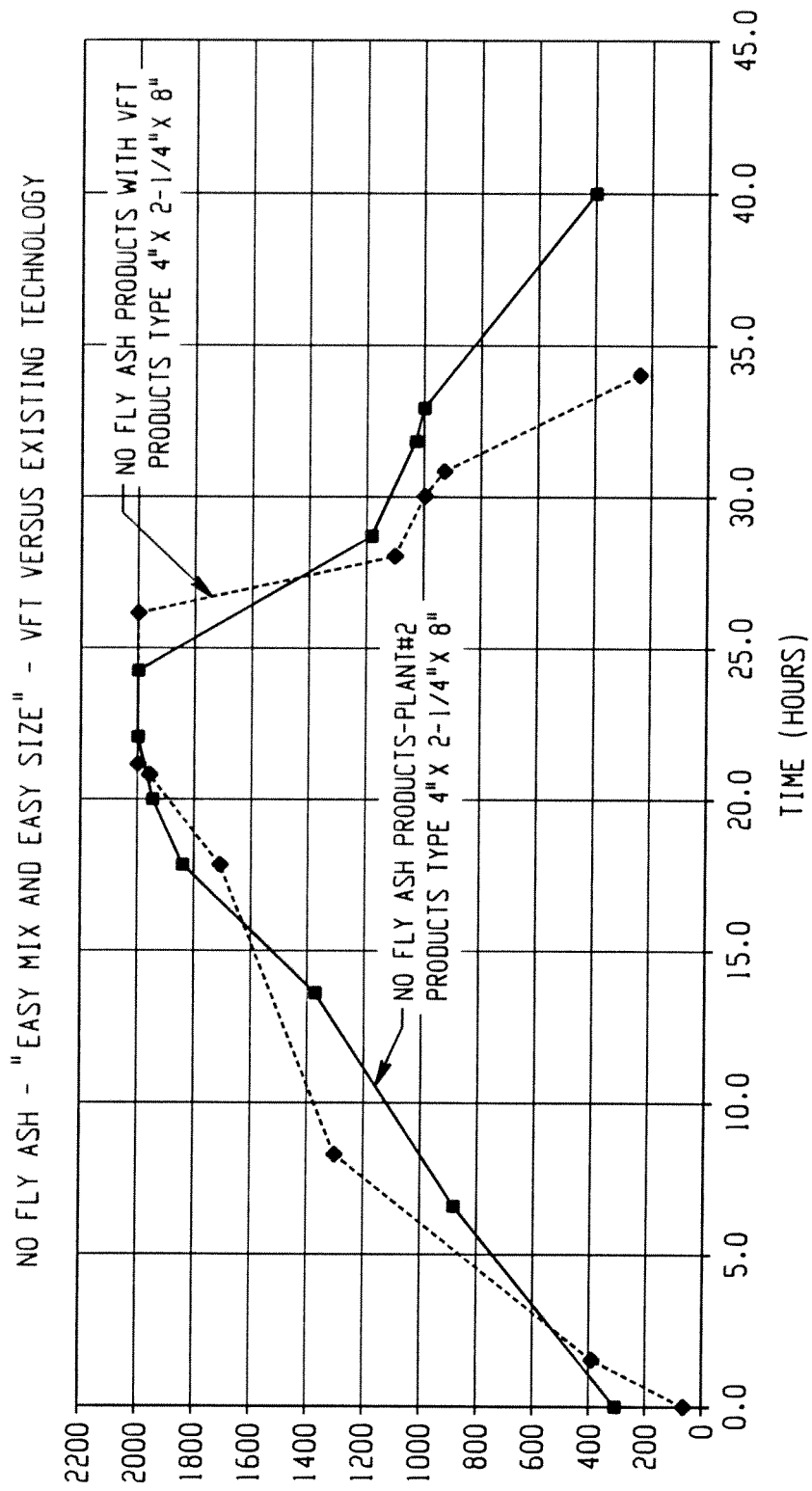
FIG. 10 illustrates test results in table and graphical format comparing bricks/pavers with no fly ash fired on VFTs relative to fly/ash bricks/pavers tired on VFTs.
Figure 10C:
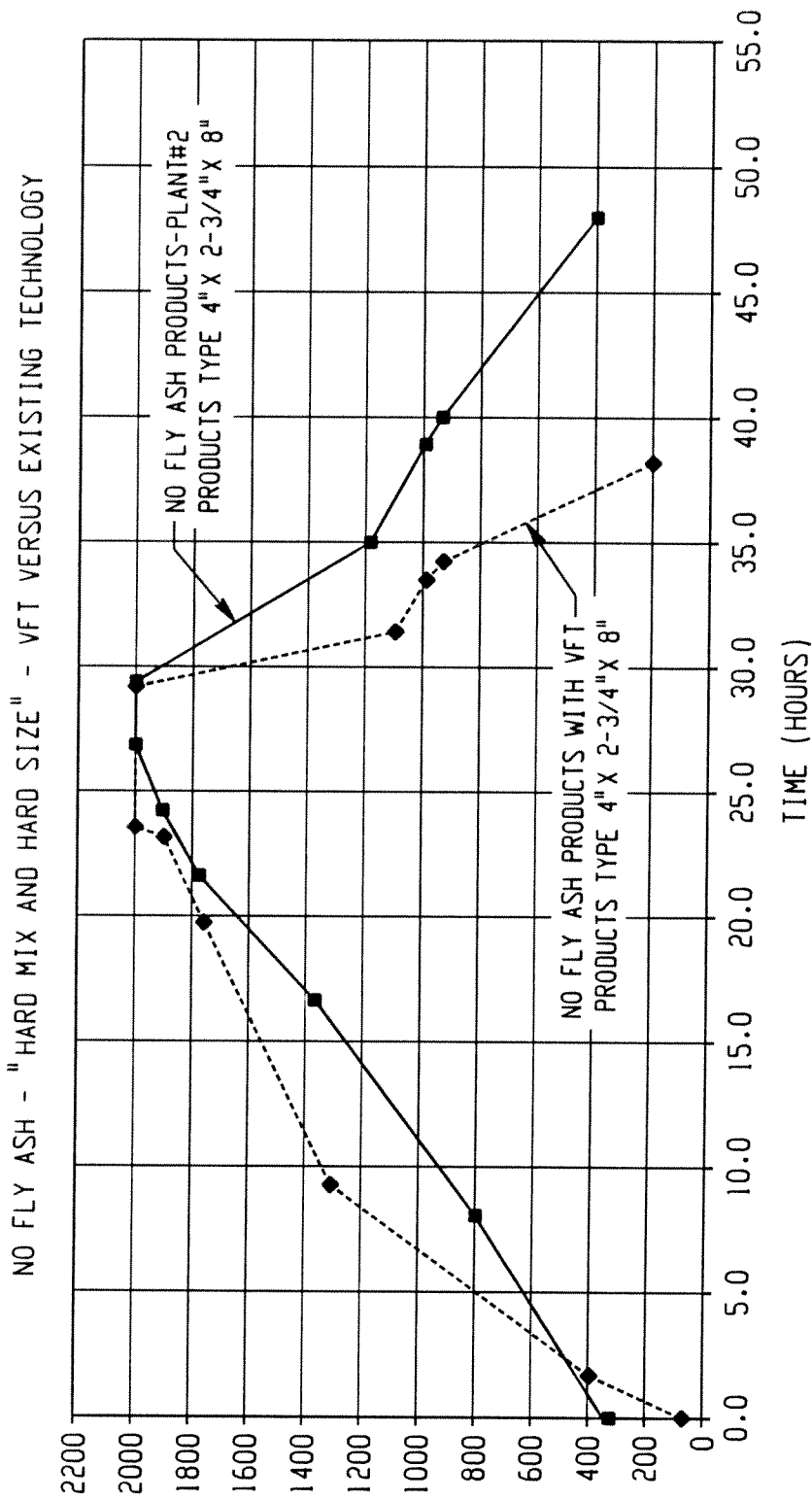
Figure 10D:
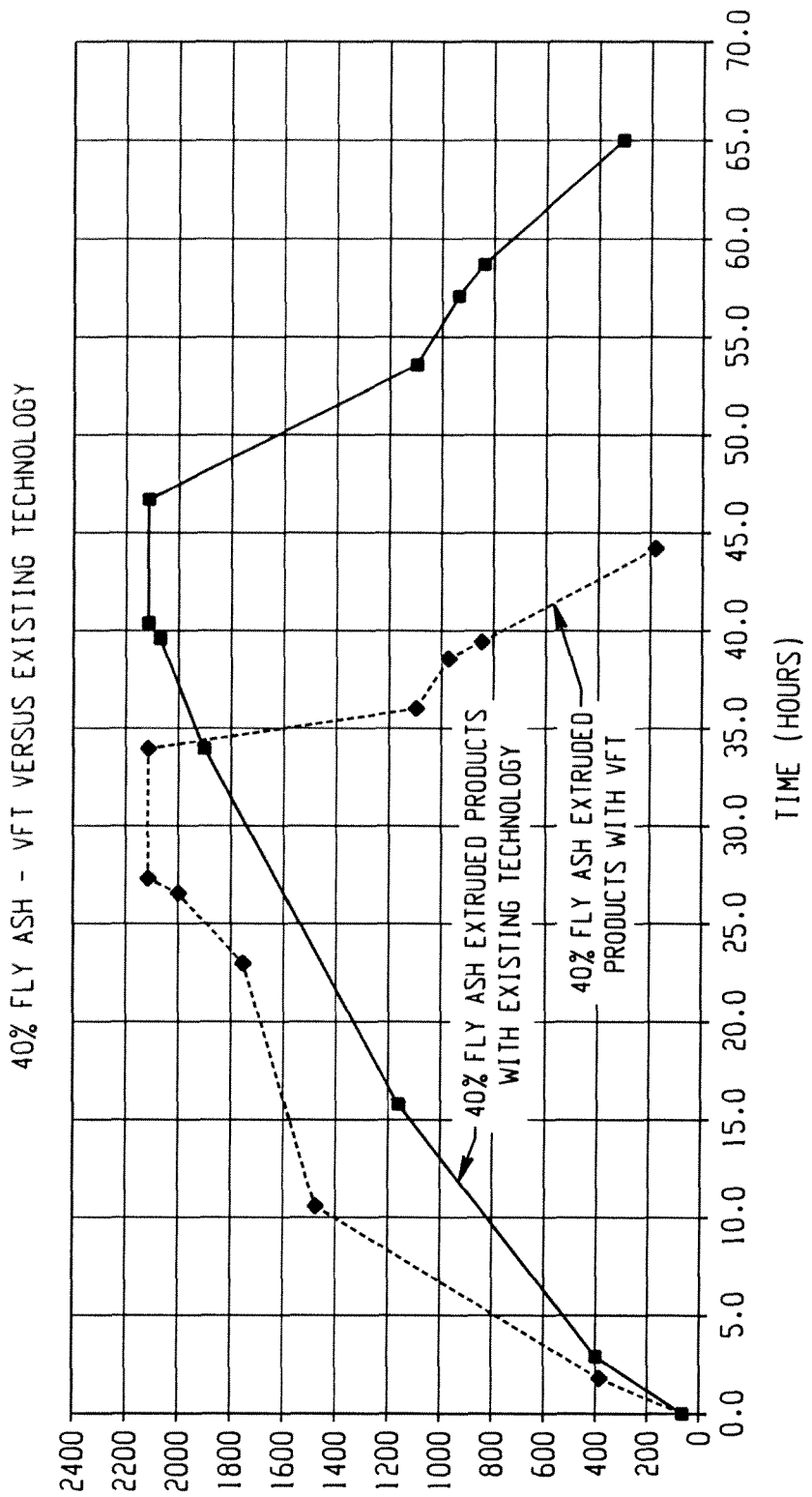

FIG. 10 is a series of tables and graphs that illustrate the improvements associated by using a high content fly ash product. The firing time is significantly reduced. The substantial reduction of time in the tunnel kiln results in a substantial reduction in energy use, and increased manufacturing efficiencies through the plant.

A coal ash-based brick product has been developed that looks and functions like conventional clay brick and contains up to 80% coal ash. The accompanying test data relates to a 70% coal ash/30% clay or shale brick mixture. The coal ash is preferably residual ash generated from the burning of bituminous coal, i.e., Class F fly ash. This type of fly ash is a non-hydrating coal ash, and does not self-cement. In contrast, Class C fly ash, which is derived from sub-bituminous coal, is a self-cementing ash that will form a solid product with the addition of water. Of these two ash types, historically there have been fewer recycle options for Class F fly ash. As will be appreciated, use of the Class F fly ash is particularly appealing.

The coal ash-based brick offers several other advantages as a brick product. For example, reduced energy consumption in a kiln is a primary advantage realized by the present process. Both cost/energy and greenhouse gas emissions are substantially reduced. On average, a coal ash brick will consume about 560 BTUs per pound which is below conventional brick making which might consume, for example, approximately 1300 BTUs per pound.

The resulting brick has improved aesthetics, namely, deep, long-term natural colors resulting from the chemical makeup of the coal ash. Aesthetics and color-fastness are very desirable characteristics in the brick industry.

A substantial reduction of raw material costs and a decrease in the demand of mined virgin clay or shale materials also results in a substantial reduction in consumption of these materials and resulting improvement associated with the coal ash brick.

More particularly, and by way of example, the brick is preferably 70% Class F coal ash and 30% clay or shale and is kiln-fired at a temperature of up to about 1150° C. Subsequent testing of the final brick resulted in passing both TCLP and SPLP tests. The excellent performance of the products in Toxicity Characteristics Leaching Procedure (TCLP) and Synthetic Precipitation Leaching Procedure (SPLP) tests are further proof of the known remediation characteristics of coal ash. For instance it has been demonstrated in the literature that fused Class F coal ash is not only safe from a hazardous metals leaching standpoint, but also such products when finely ground and used as filter media, can be used to remediate solids contaminated with hazardous waste metals.

In the firing process, the coal ash is fused together, thereby binding in the brick as metal oxides the EPA hazardous metals, such as arsenic, cadmium and chromium, etc. Once fused, these metal oxides do not leach metals above regulated or allowable EPA levels. Due to its lower boiling point, mercury, which is another constituent in the coal at low levels, will be vaporized in the kiln process, and then will be captured by activated carbon scrubbers to prevent emissions into the atmosphere consistent with the brick National Emission Standards for Hazardous Air Pollutants rules at 40 CFR Part 63, Subpart JJJJJ. The mercury laden activated carbon will subsequently be sent to a third party who will separate the mercury from the activated carbon and then sell the mercury for industrial use.

This ash-based brick technology can be used for the production of high strength pavers having compressive strengths in excess of ASTM (C1272-07) specification of 10,000 psi for extruded pavers and 8,000 psi for molded pavers. In the paver industry, the ash-based product would compete with current pavers that are produced from Portland cement concrete. Production of a standard concrete paver made from Portland cement would emit 1.185 lbs. of $CO_2$, whereas production of an equivalent paver made with 70% coal ash would emit only 0.94 lbs. of $CO_2$. The Portland cement pavers are also not as durable in their life cycle as are ash-based pavers, primarily due to the water absorption. As a result, the new ash-based pavers are expected to have field service of more than two times that of concrete pavers, thereby demonstrating even higher efficiencies in energy consumption and greenhouse gas emissions.

In addition, these features and the process can be used to manufacture not only permeable pavers but also face brick.

A primary feature of the present disclosure is the use of a variable firing tray for introduction of molded bricks into the kiln. The variable firing trays are formed from a silicon-silicon carbide (SiSiC) and increase the exposed surface of the bricks thereby allowing a more uniform heat distribution. This, in turn, lowers the energy requirements. When coal ash reaches a certain temperature, the brick releases a significant amount of energy thereby reducing the amount of outside fuel necessary in the process.

Whereas a typical clay brick would require about 24 to about 36 hours to dry, the coal ash-based brick of about 60-80% coal ash will dry in about 16 hours. In the dry form, the brick is not as strong and therefore moving the dry bricks from the drying room to the kiln must be performed with care because the brick is brittle and subject to chipping. By using the variable firing trays to support the brick, the bricks could be edge set, and fired in about one-half of the time of conventional clay bricks (e.g., can fire the coal ash bricks in about 55 hours instead of the typical approximately 74 hours required for conventional clay bricks). The integrity of the brick structure is maintained by placing the stacked bricks on the silicate carbide bars. In addition, the use of the variable firing trays allows the brick manufacturer to make larger green bodies for introduction into the kiln, and lowers the BTUs used in firing the bricks.

Class F coal ash has a carbon content on the order of 8-16% whereas the carbon content in Class C fly ash is more typically on the order of 1-5%. Blending the coal ash with the clay allows the molded green brick to be more easily removed from the press mold, (i.e., since less water is used, the material flows better). Further, since there is less water, the brick does not need to dry as long and the expense of drying is thereby reduced. The drying temperature is approximately 400° F. and oftentimes the waste heat from the kiln is used for the drying process. The drying time is significantly reduced from approximately 24-36 hours to about 12-18 hours for the coal ash brick.

It is also contemplated that the coal ash can be all Class F coal ash combined with clay, or may be Class C coal ash combined with clay, or part Class F and part Class C combined with clay. Whereas use of the Class C coal ash typically results in a cream colored brick, the Class F brick produces a red brick as a result of the iron oxide present in the coal ash (the iron oxide is present in an amount that can range from 15% to 20%). As a result, it is not expected that expensive colorants need to be added to the recipe.

In summary, coal ash mixed with shale or fire clay has been around for a long time. Heretofore, coal ash bricks have only been commercialized in automated brick plants by using the extruded method with 40% or less of coal ash and 60% or more of shale or clay. The inability to extrude bricks with more than 40% coal ash on a commercial basis (even though there has been bench testing of 50% coal ash by extruding) is believed to result from the mixture of coal ash and clay in such percentages de-watering too quickly causing the bricks to lose their shape. Press molding high content 60% coal ash in bricks has not been commercialized into a product line and or business. In order to commercialize bricks with more than 40% coal ash, it becomes necessary to press mold the brick. Small successful production tests at a brick plant where 250 to 400 bricks were made per trial with 70% coal ash and 30% shale/clay, and also making 10,000 bricks with 74% coal ash and 26% shale/clay with a press mold machine, have been achieved. Once bricks are press molded and put in a drying room for 15 to 24 hours, they become brittle and are very sensitive to chipping. In a conventional manner, bricks would be transported from the drying room and then be stacked on a kiln car (normally) 4 to 20 bricks high by using belts, setting machines, and/or robots. Previous conclusions suggested that the bricks would have to be laid flat (supported by a surface along an elongated face of the brick) when stacking (not conducive to production manufacturing). This conclusion was reached for two reasons, specifically, that this was the best way to try to reduce chipping problems and the brick did not have enough dry green strength to support itself on its side when stacking them. Given the initial conclusion that the bricks had to be flat, the commercial plant would require a kiln over 1,000 plus feet long at an unmanageable expense, and there would also be a requirement for additional kiln cars—again, an undesired cost. By using the variable firing trays, an effective solution is provided that significantly minimizes the handling of the bricks (less chances of chipping) and the variable firing tray stacking method reduces the kiln length by one-half and the firing time in the kiln by one-half from the anticipated 1,000 foot kiln.

The use of the VFTs makes a more uniform brick and greatly reduces production waste. For example in traditional tunnel kiln brick manufacturing, one can expect a slight variation in brick size depending on whether the brick is at the top, bottom, or middle of the setting pattern. In many cases one can also expect some loss of production at the bottom of the setting pattern. This innovation will result in a more efficient production process and will allow brick to compete with concrete products which do not suffer from size variation of traditional brick.

It is also contemplated that crushed, fine grind glass may be added to the recipe for the brick/pavers and could be a substitute for either the clay/shale and/or the coal ash. The fine grind glass would constitute approximately 1-5% of the total mix. The glass helps to reduce the firing temperature, creates a more dense/heavier final brick or paver, and results in lower absorption in the final product, and also acts as a flux in the firing process so that components of the final product bind better.

The disclosure has been described with reference to the preferred embodiments. Obviously, modifications and alterations will occur to others upon reading and understanding the preceding detailed description. It is intended that the disclosure be construed as including all such modifications and alterations.

What we claim is:

1. A process for the manufacture of bricks or pavers by press molding, the process comprising:
   a) providing a mixture of at least 60% by weight fly ash and up to 40% by weight of clay, shale, or a mixture thereof;
   b) introducing the mixture from (a) to a press mold and molding the mixture into green bricks or pavers;
   c) arranging the press molded bricks or pavers in stacks and drying the green bricks or pavers for about 12 to 18 hours to render dried bricks or pavers;
   d) after the drying step, loading the dried bricks or pavers onto variable firing trays and stacking the variable firing trays on kiln cars;
   e) firing the dried bricks or pavers in a kiln for up to about 55 hours after the loading step; and
   f) removing the fired bricks or pavers from the variable firing trays, wherein the process consumes about 560 BTUs per pound of manufactured brick or paver.

2. The process of claim 1 wherein mixture providing step includes incorporating Class C fly ash, Class F fly ash, or a combination thereof.

3. The process of claim 1 wherein the mixture providing step (a) further includes incorporating barium and/or colorant.

4. The process of claim 1 wherein the mixture introducing step to the press mold in step (b) further includes incorporating recycled green brick or paver material from steps (c)-(d).

5. The process of claim 1 further wherein the arranging step includes the step of stacking press molded bricks from step (b) on pallets and loading the pallets on dryer racks that are then passed through a dryer in step (c).

6. The process of claim 5 further including the step of removing the dried bricks from the pallets before loading them onto the variable firing trays.

7. The process of claim 1 wherein the bricks release heat during the firing in step (e) and further comprising returning at least a portion of the heat to the dryer for use in drying the bricks in step (c).

8. A process for the manufacture of bricks by press molding, the process comprising:
   a) providing a mixture of at least 60% by weight fly ash and up to 40% by weight of clay, shale, or a mixture thereof;
   b) introducing the mixture from (a) to a press mold and molding the mixture into green bricks;
   c) drying the green bricks for about 12 to 18 hours to render dried bricks;
   d) loading the dried bricks onto variable firing trays and stacking the variable firing trays on kiln cars;
   e) firing the dried bricks in a kiln for up to about 55 hours;
   f) removing the fired bricks from the variable firing trays, wherein the process consumes about 560 BTUs per pound of manufactured brick; and
   g) using ground glass in a total amount of approximately 1-5% by weight of the mixture.

9. A process for the manufacture of bricks by press molding and subsequently used as a filter material, the process comprising:
   a) providing a mixture of at least 60% by weight fly ash and up to 40% by weight of clay, shale, or a mixture thereof;
   b) introducing the mixture from (a) to a press mold and molding the mixture into green bricks;
   c) drying the green bricks for about 12 to 18 hours to render dried bricks;
   d) loading the dried bricks onto variable firing trays and stacking the variable firing trays on kiln cars;
   e) firing the dried bricks in a kiln for up to about 55 hours; and
   f) removing the fired bricks from the variable firing trays, wherein the process consumes about 560 BTUs per pound of manufactured brick, wherein the manufactured brick is ground and used as filter material to remediate solids contaminated with hazardous waste materials.

10. The process of claim 1 wherein the firing step (e) includes rendering inert hazardous material in the fly ash included within the fired brick renders.

11. The process of claim 1 wherein the mixture of step (a) further includes providing water.

12. The process of claim 1 wherein the variable firing trays used in the process are formed by providing a pair of end members in spaced parallel relation, and at least two support members in spaced parallel relation to each other and positioned between and perpendicular to the end members, each distal end of each support member fixedly attached to one or the other end member, and further providing one or more grooved plate members that rest horizontally on at least a portion of one or more support members in a planar manner.

13. The process of claim 12 further including forming the support members of silicon carbide.

14. The process of claim 12 further comprising stacking the variable firing trays on one another to provide increased firing capacity.

15. The process of claim 1 wherein the variable firing tray loading step includes stacking the variable firing trays one atop another so that vertical stacking loads are converged through the variable firing trays.

16. The process of claim 1 wherein the loading of step (d) includes edge setting the dried bricks or pavers onto the variable firing trays.

17. The process of claim 1 wherein step (b) includes press molding pavers or bricks in at least one of the following sizes of 4×8×2¼; 4×8×2¾; 4½×9×2¼; 8×8×2¼; 8×8×2¾;

6×6×2¼; 6×6×2¾; 6×9×2¼; 6×9×2¾; 4×12×2¼; 4×12×2¾; 5×10×2¼; 5×10×2¾; 3×7⅝×2¼; 3×7⅝×2¾; 3×11⅝×2¼; and 3×11⅝×2¾.

18. The process of claim 1 wherein the drying of the green bricks or pavers of step (c) includes exposing the green bricks or pavers to a temperature on the order of 400° F.

19. The process of claim 1 wherein the firing step of step (e) includes operating at about 1150° C.

20. The process of claim 1 wherein step (d) includes forming the variable firing trays with silicon carbide support bars having refractory support plates extending thereover to support the dried pavers or bricks on a corrugate-type structure that maximizes a surface area of the dried paver or brick to kiln temperatures.

21. The process of claim 1 further comprising edge setting the dried bricks or pavers onto the variable firing trays and stacking the variable firing trays on one another to provide increased firing capacity.

* * * * *